(12) United States Patent
Saksena et al.

(10) Patent No.: US 10,171,358 B2
(45) Date of Patent: Jan. 1, 2019

(54) PORT CONGESTION RESILIENCY IN A MULTI-CARD AND MULTI-SWITCH LINK AGGREGATION GROUP

(71) Applicant: Ciena Corporation, Hanover, MD (US)

(72) Inventors: Anubhav Saksena, New Delhi (IN); Rajeev Chandwani, New Delhi (IN); Shivam Agarwal, Allahabad (IN)

(73) Assignee: Ciena Corporation, Hanover, MD (US)

( * ) Notice: Subject to any disclaimer, the term of this patent is extended or adjusted under 35 U.S.C. 154(b) by 221 days.

(21) Appl. No.: 15/072,536

(22) Filed: Mar. 17, 2016

(65) Prior Publication Data

US 2017/0230294 A1 Aug. 10, 2017

(30) Foreign Application Priority Data

Feb. 4, 2016 (IN) .............................. 201611003986

(51) Int. Cl.
*H04L 12/709* (2013.01)
*H04L 12/801* (2013.01)
*H04L 12/803* (2013.01)
*H04L 12/891* (2013.01)
*H04L 12/931* (2013.01)

(52) U.S. Cl.
CPC ............ *H04L 47/12* (2013.01); *H04L 47/125* (2013.01); *H04L 49/50* (2013.01); *H04L 45/245* (2013.01); *H04L 47/41* (2013.01)

(58) Field of Classification Search
CPC ..... H04L 47/12; H04L 49/50; H04L 45/7453; H04L 47/125; H04L 45/00; H04L 45/50; H04L 63/0272; H04L 41/12; H04L 45/38; H04L 69/14; H04L 47/41; H04L 45/245; H04L 47/827

See application file for complete search history.

(56) References Cited

U.S. PATENT DOCUMENTS

| 7,414,985 | B1 | 8/2008 | Tedijanto et al. |
| 7,835,362 | B2 | 11/2010 | Libby et al. |
| 7,903,554 | B1* | 3/2011 | Manur .................. H04L 45/026 370/230.1 |
| 8,306,039 | B2 | 11/2012 | Saksena et al. |
| 2008/0298236 | A1* | 12/2008 | Ervin ...................... H04L 47/10 370/232 |

(Continued)

*Primary Examiner* — Oussama Roudani
(74) *Attorney, Agent, or Firm* — Clements Bernard Walker PLLC; Christopher L. Bernard; Lawrence A. Baratta, Jr.

(57) ABSTRACT

Systems and methods for port congestion resiliency in a Link Aggregation Group (LAG) including a multi-card LAG and/or a multi-switch LAG. A method includes receiving a packet for egress over the LAG; responsive to determining no congestion over internal ports not part of the LAG, hashing with all member ports in the LAG in a distribution state; and, responsive to determining congestion over the internal ports, hashing with only member ports on a local card in which the packet was received, wherein the hashing determines which member port the packet egresses from in the LAG. The multi-card LAG includes multiple cards where packets ingress and egress from, and the cards communicate via a backplane port which is not part of the LAG. The multi-switch LAG includes multiple chassis where packets ingress and egress from, and the chassis communicate via an inter-switch connectivity port which is not part of the LAG.

16 Claims, 12 Drawing Sheets

(56) References Cited

U.S. PATENT DOCUMENTS

2014/0071825 A1   3/2014  Chhabra et al.
2014/0211621 A1   7/2014  Sundaram et al.
2014/0301401 A1* 10/2014  Wang ..................... H04L 49/70
                                                    370/395.53

* cited by examiner

PORT CONGESTION RESILIENCY IN A MULTI-CARD AND MULTI-SWITCH LINK AGGREGATION GROUP

CROSS-REFERENCE TO RELATED APPLICATION(S)

The present patent application/patent claims the benefit of priority of Indian Patent Application No. 201611003986, filed on Feb. 4, 2016, and entitled "PORT CONGESTION RESILIENCY IN A MULTI-CARD AND MULTI-SWITCH LINK AGGREGATION GROUP," the contents of which are incorporated in full by reference herein.

FIELD OF THE DISCLOSURE

The present disclosure generally relates to networking systems and methods. More particularly, the present disclosure relates to backplane port and inter-switch connectivity port congestion resiliency systems and methods in a multi-card and/or multi-switch Link Aggregation Group (LAG).

BACKGROUND OF THE DISCLOSURE

Link Aggregation described in IEEE 802.1AX-2008 (formerly IEEE 802.3ad), the contents of which are incorporated by reference, describes how to combine multiple Local Area Network (LAN) cables in parallel. The advantages of link aggregation in contrast with conventional connections using an individual cable include a higher potential transmission speed (e.g., 3 Gb/s versus a single Gigabit Ethernet (GbE)) and higher accessibility (i.e., protection and redundancy). Link aggregation allows for the distribution of Ethernet frames to all physical links available to a Link Aggregation Group (LAG) connection. Thus, the potential data throughput will exceed the data rate of a single physical link. The IEEE standard does not define a specific algorithm for distribution (Frame Distribution). However, individual guidelines are: the order of frames for a specific data communication packet may not be transposed, and frames may not be duplicated.

LAGs are typically deployed on faceplate ports, i.e., network facing ports. In a multi-card LAG, different faceplate ports are located on different line cards and internal to a switch, the different line cards communicate with one another over backplane ports. In a multi-switch LAG, different faceplate ports are located on different switches and the different switches communicate with one another over inter-switch connectivity ports. In either scenario or a combination of both, there are situations where packets egressing from a LAG are dropped due to congestion on the backplane ports or the inter-switch connectivity ports, which are not part of the LAG. Thus, it would be advantageous to have backplane port and inter-switch connectivity port congestion resiliency in a multi-card and/or multi-switch LAG.

BRIEF SUMMARY OF THE DISCLOSURE

In an exemplary embodiment, a method for port congestion resiliency in a Link Aggregation Group (LAG) including one or more of a multi-card LAG and a multi-switch LAG includes receiving a packet for egress over the LAG; responsive to determining no congestion over internal ports not part of the LAG, hashing with all member ports in the LAG in a distribution state; and, responsive to determining congestion over the internal ports, hashing with only member ports on a local card in which the packet was received, wherein the hashing determines which member port the packet egresses from in the LAG. The multi-card LAG includes a plurality of cards where packets ingress and egress from and the plurality of cards communicate via the internal ports including a backplane port which is not part of the LAG. The multi-switch LAG includes a plurality of chassis where packets ingress and egress from and the plurality of chassis communicate via the internal ports including an inter-switch connectivity port which is not part of the LAG. The LAG can operate in compliance with one or more of IEEE 802.1AX-2008 and IEEE 802.3ad. The internal ports can include X Gb/s of bandwidth and all ports in a network element associated with the LAG can include Y Gb/s of bandwidth with Y>X. The member ports can utilize Link Aggregation Control Protocol (LACP) for membership control and the internal ports do not utilize LACP. The hashing with only member ports on a local card can modify input parameters to the hashing to exclude member ports on a remote card or a remote chassis. The hashing can be performed based on TAG values associated with the packet.

In another exemplary embodiment, an apparatus for port congestion resiliency in a Link Aggregation Group (LAG) including one or more of a multi-card LAG and a multi-switch LAG includes circuitry adapted to receive a packet for egress over the LAG; circuitry adapted to, responsive to no congestion over internal ports not part of the LAG, hash with all member ports in the LAG in a distribution state; and circuitry adapted to, responsive to congestion over the internal ports, hash with only member ports on a local card in which the packet was received, wherein the hash determines which member port the packet egresses from in the LAG. The multi-card LAG includes a plurality of cards where packets ingress and egress from and the plurality of cards communicate via the internal ports including a backplane port which is not part of the LAG. The multi-switch LAG includes a plurality of chassis where packets ingress and egress from and the plurality of chassis communicate via the internal ports including an inter-switch connectivity port which is not part of the LAG. The LAG can operate in compliance with one or more of IEEE 802.1AX-2008 and IEEE 802.3ad. The internal ports can include X Gb/s of bandwidth and all ports in a network element associated with the LAG can include Y Gb/s of bandwidth with Y>X. The member ports can utilize Link Aggregation Control Protocol (LACP) for membership control and the internal ports do not utilize LACP. The hash with only member ports on a local card can modify input parameters to the hashing to exclude member ports on a remote card or a remote chassis.

In a further exemplary embodiment, a network element adapted for port congestion resiliency in a Link Aggregation Group (LAG) including one or more of a multi-card LAG and a multi-switch LAG includes one or more chassis, wherein each of the one or more chassis includes a backplane and the one or more chassis are connected by inter-switch connectivity ports; and one or more cards in the one or more chassis including member ports for the LAG, wherein the one or more cards communicate to one another in a same chassis via a backplane port over the backplane and the one or more cards in different chassis communicate to one another via the inter-switch connectivity ports, wherein the backplane port and the inter-switch connectivity ports include internal ports in the network element; wherein the network element operates the LAG and is configured to receive a packet for egress over the LAG, responsive to no congestion over internal ports not part of the LAG, hash with all member ports in the LAG in a distribution state, and, responsive to congestion over the internal ports, hash with only member ports on a local card in which the packet was received, wherein the hash determines which member port the packet egresses from in the LAG. The LAG can operate in compliance with one or more of IEEE 802.1AX-2008 and IEEE 802.3ad. The internal ports can include X Gb/s of bandwidth and all ports in a network element associated with the LAG can include Y Gb/s of bandwidth with Y>X. The member ports can utilize Link Aggregation Control Protocol (LACP) for membership control and the internal ports do not utilize LACP. The hash with only member ports on a local card can modify input parameters to the hashing to exclude member ports on a remote card or a remote chassis.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, the present disclosure relates to backplane port and inter-switch connectivity port congestion resiliency systems and methods in a multi-card and/or multi-switch LAG. The systems and methods deal with internal ports relative to faceplate ports which are part of multi-card/switch LAG. Specifically, the internal ports can include backplane ports and/or inter-switch connectivity ports which are monitored relative to their congestion. When there is congestion on these ports and where traffic lands/ingresses on one port of one card of the multi-card/switch LAG and that traffic has to be egressed from the member ports of the multi-card/switch LAG, the systems and methods require the traffic to egress from the same card thereby eliminating a risk of traffic loss due to congestion at internal ports. Again, a multi-card LAG is one in which faceplate ports on a same chassis/shelf/network element are spread across different cards with connectivity via backplane ports which are not part of the LAG. A multi-switch LAG is one in which the faceplate ports are spread across different shelves/chassis/network elements with inter-switch connectivity ports which are not part of the LAG. The systems and methods provide resiliency where internal congestion (i.e., on the backplane ports, the inter-switch connectivity ports, etc.) does not affect the LAG.

Figure 1:
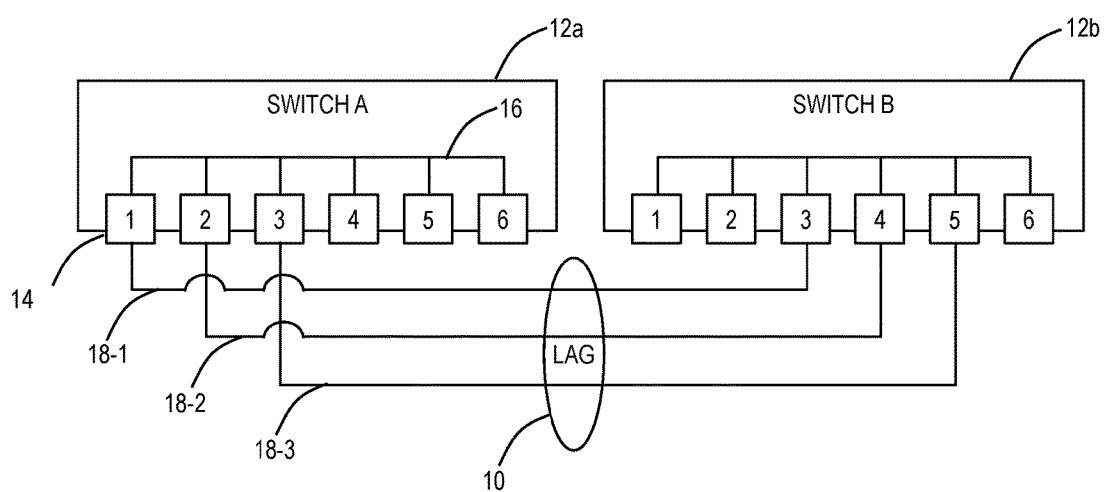
FIG. 1 is a block diagram of a multi-card LAG configuration between two network elements.

Referring to FIG. 1, in an exemplary embodiment, a block diagram illustrates a multi-card LAG 10 configuration between two network elements 12a, 12b. The network elements 12a, 12b can be switches and each is shown with six exemplary faceplate ports 14. Each of the faceplate ports 14 can be on one or more line cards in each of the network elements 12a, 12b connected by backplane ports 16. In this example, the LAG 10 includes three connections 18-1, 18-2, 18-3, one between port 14-1 on the network element 12a and port 14-3 on the network element 12b, one between port 14-2 on the network element 12a and port 14-4 on the network element 12b, and one between port 14-3 on the network element 12a and port 14-5 on the network element 12b. Various other configurations are also contemplated. For a multi-switch configuration, the network elements 12a, 12b would be multiple shelves interconnected by inter-switch connectivity ports (not shown). In this example, the faceplate ports 14 are part of the LAG 10, but the backplane ports 16 are not.

Again, Link Aggregation is defined in IEEE 802.3ad. Link Aggregation or trunking is a method of combining physical network links, such as the connections 18-1, 18-2, 18-3, into a single logical link (the LAG 10) for increased bandwidth as well as protection. With Link aggregation, the capacity and availability of the connections 18-1, 18-2, 18-3 are increased between the network elements 12a, 12b (both switches and end stations) using existing Fast Ethernet and Gigabit Ethernet technology. Two or more Gigabit Ethernet connections are combined in order to increase the bandwidth capability and to create resilient and redundant links. A set of multiple parallel physical links between two devices is grouped together to form a single logical link.

Link Aggregation also provides load balancing where the processing and communications activity is distributed across several links in a trunk so that no single link is overwhelmed. By taking multiple LAN connections 18 and treating them as a unified, aggregated link, practical benefits are achieved in many applications. Link Aggregation provides the following important benefits: i) higher link availability, ii) increased link capacity, and iii) improvements are obtained using existing hardware (no upgrading to higher-capacity link technology is necessary).

A Multi-card/switch LAG is essentially a LAG with member ports physically distributed across multiple modules/cards or switches. The membership control is done via Link Aggregation Control Protocol (LACP). When it comes to card failures, the Multi-card/switch LAG would still have an active port on the mated card, and hence, the LAG functionality would still work maximizing Link aggregation capacity.

Figure 2:
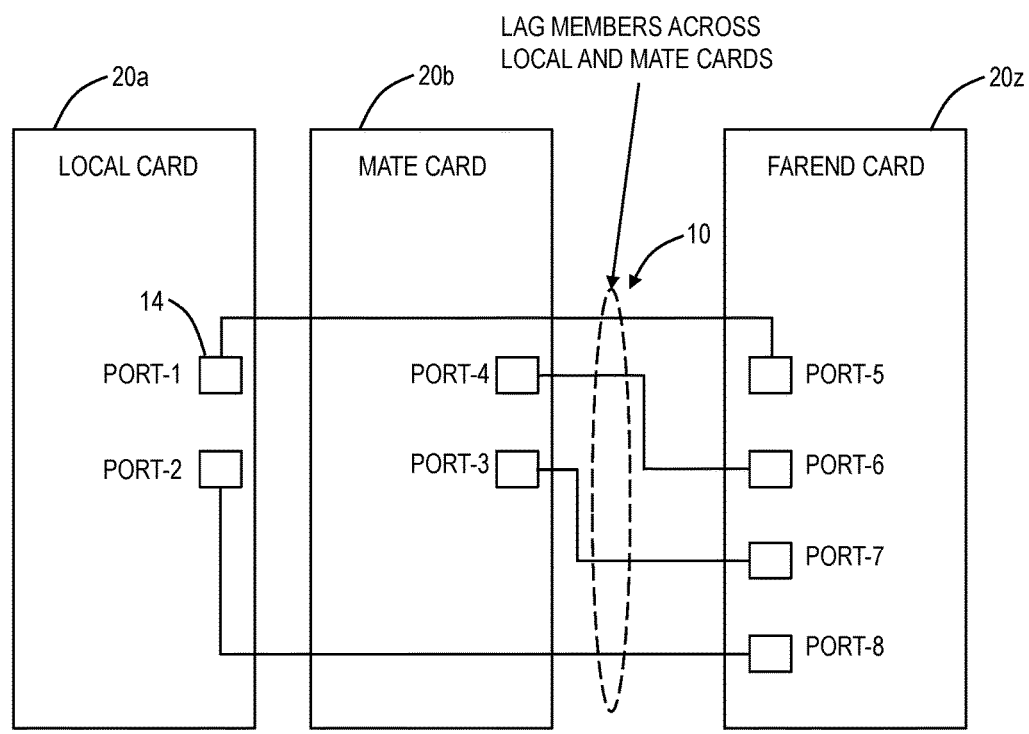
FIG. 2 is a block diagram of card level details for the multi-card LAG of FIG. 1.

Referring to FIG. 2, in an exemplary embodiment, a block diagram illustrates card level details for a multi-card LAG 10. In this example, there are three cards 20, namely a local card 20a, a mate card 20b, and a far end card 20z. The local card 20a and the mate card 20b may be located in the same network element or across different network elements in a multi-switch configuration. The cards 20a, 20b, 20z are line cards, line modules, port modules, blades, circuit packs, etc. that are configured to connect to a backplane, midplane, etc. in the associated network element. The card 20a, 20b, 20z include circuitry for packet switching and interfacing to the associated faceplate ports 14. In this example, the local card 20a include faceplate ports 14 port-1, port 2, the mate card 20b includes faceplate ports 14 port-3, port-4, and the far end card 20z includes faceplate ports port-5 though port-8. For the multi-card LAG 10, the two ports 14 on the local card 20a and the two ports 14 on the mate card 20b each are in the LAG 10 and connected to an associated port 14 on the far end card 20z. Thus, at the local card 20a and the mate card 20b, the LAG 10 is spread across different cards/switches.

Multi-card/switch Link Aggregation has a few added advantages over normal Link Aggregation. For example, the multi-card/switch LAG 10 allows for card/node redundancy, such as when the local card 20a has a failure, traffic flow will not be impacted as the standby link on the mate card 20b will take over as an active member, and distribution will happen over this link now.

Figure 3:
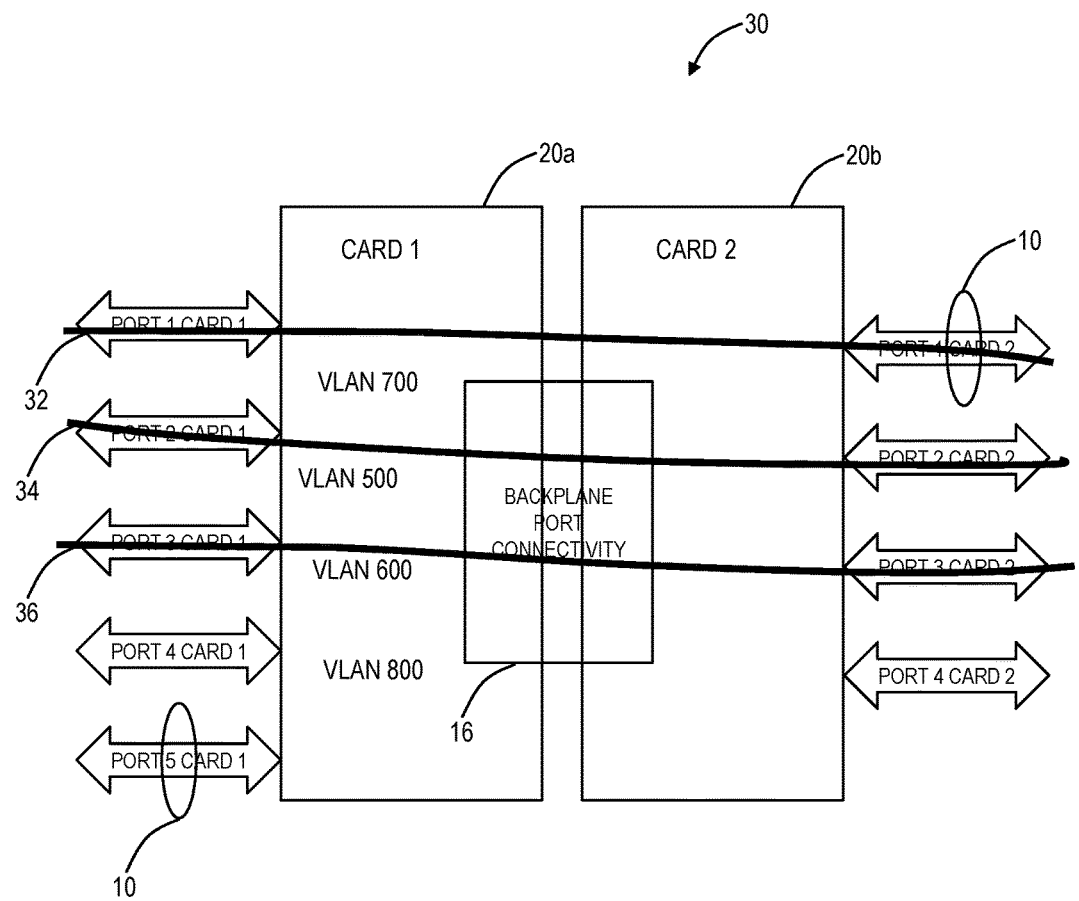
FIGS. 3 and 4 are block diagrams of internal connections in a network element with two cards interconnected by backplane ports.
Figure 4:
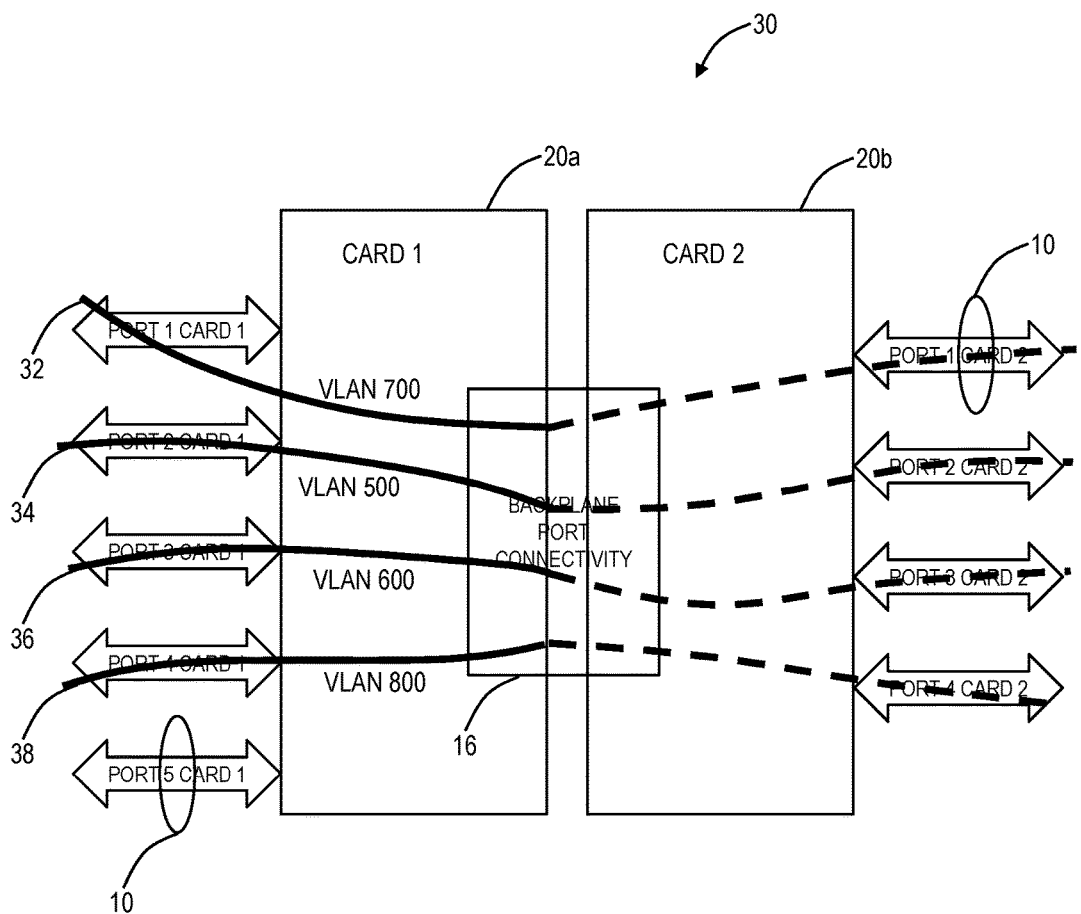

Referring to FIGS. 3 and 4, in an exemplary embodiment, block diagrams illustrates internal connections in a network element 12 with two cards 20a, 20b interconnected by backplane ports 16. Note, for various exemplary embodiments described herein, reference is made to the backplane ports 16 which are internal communication ports in the network element 12 which are not part of the LAG 10. These internal communication ports enable communication between the multiple cards 20a, 20b for the multi-card LAG 10. The backplane ports 16 can also be inter-switch connectivity ports which extend communication between two different switches, i.e., for a multi-switch LAG and the inter-switch connectivity ports are also not a part of the LAG 10. The techniques for reducing congestion on the backplane ports 16 can apply equally to the inter-switch connectivity ports.

In FIGS. 3 and 4, the cards 20a, 20b are two cards existing on a same shelf/chassis in a mate/stacked configuration, i.e., a multi-card LAG. For example, port-5/card-1 and port-1/card-2 can be 1 GbE members of a multi-card LAG 10. All of the ports on each of the cards 20a, 20b are 1 GbE physical ports. Assume the backplane port 16 connectivity is 3 Gb/s capacity.

In FIG. 3, there are three streams 32, 34, 36 of 1 Gb/s, such as for Virtual Local Area Networks (VLAN) VLAN 700, 500, 600, respectively. The details of FIG. 3 are as follows:

| VLAN: ID | Stream | Ingress port | Egress port | Ingress Traffic Rate |
|---|---|---|---|---|
| 500 | 34 | Port-2/card-1 | Port-2/card-2 | 1 Gb/s |
| 600 | 36 | Port-3/card-1 | Port-3/card-2 | 1 Gb/s |
| 700 | 32 | Port-1/card-1 | Port-1/card-2 (Multi-Card LAG) | 1 Gb/s |
| Total Bandwidth used of Backplane Port/Capacity of Backplane Port | | | | 3 Gb/s/ 3 Gb/s |

In the scenario of FIG. 3, all three traffic streams 32, 34, 36 are utilizing the backplane ports 16 because packets are ingressed on one card 20a and egressed on another card 20b. And since all the streams 32, 34, 36 are using the backplane port 16, all the bandwidth of backplane port 16 is used.

In FIG. 4, now consider a scenario in a multi-card/switch 30 where there are four streams 32, 34, 36, 38 of 1 Gb/s, such as for Virtual Local Area Networks (VLAN) VLAN 700, 500, 600, 800, respectively. The traffic from the stream 32 is getting egressed from the multi-card/switch LAG member port residing on the mate card 20b, i.e., the port-1/card-2, also each stream shall use the backplane port 16 thus the total capacity of the backplane port that will be required is 4 Gb/s. However, in this example, the backplane port 16 is of 3 Gb/s hence this stream 32 will lead to congestion of the backplane port 16 causing dropping of packets for each stream 32, 34, 36, 38. The details of FIG. 4 are as follows:

| VLAN: ID | Stream | Ingress port | Egress port | Ingress Traffic Rate |
|---|---|---|---|---|
| 500 | 34 | Port-2/card-1 | Port-2/card-2 | 1 Gb/s |
| 600 | 36 | Port-3/card-1 | Port-3/card-2 | 1 Gb/s |
| 700 | 32 | Port-1/card-1 | Port-1/card-2 (Multi-Card LAG) | 1 Gb/s |
| 800 | 38 | Port-4/card-1 | Port-4/card-2 | 1 Gb/s |
| Total Bandwidth used of Backplane Port/Capacity of Backplane Port | | | | 4 Gb/s/ 3 Gb/s |

Thus, with the current implementation of multi-card link aggregation, there could easily be a situation where packets to be egressed from multi-card LAG are dropped due to backplane ports getting congested wherein backplane is not part of multi-card LAG even though packets could have been egressed out of multi-card LAG without passing through backplane port. However, no such mechanism exists to switch dynamically multi-card LAG traffic from a remote module/card to a local module/card on which traffic is received when backplane port 16 gets congested.

Figure 5:
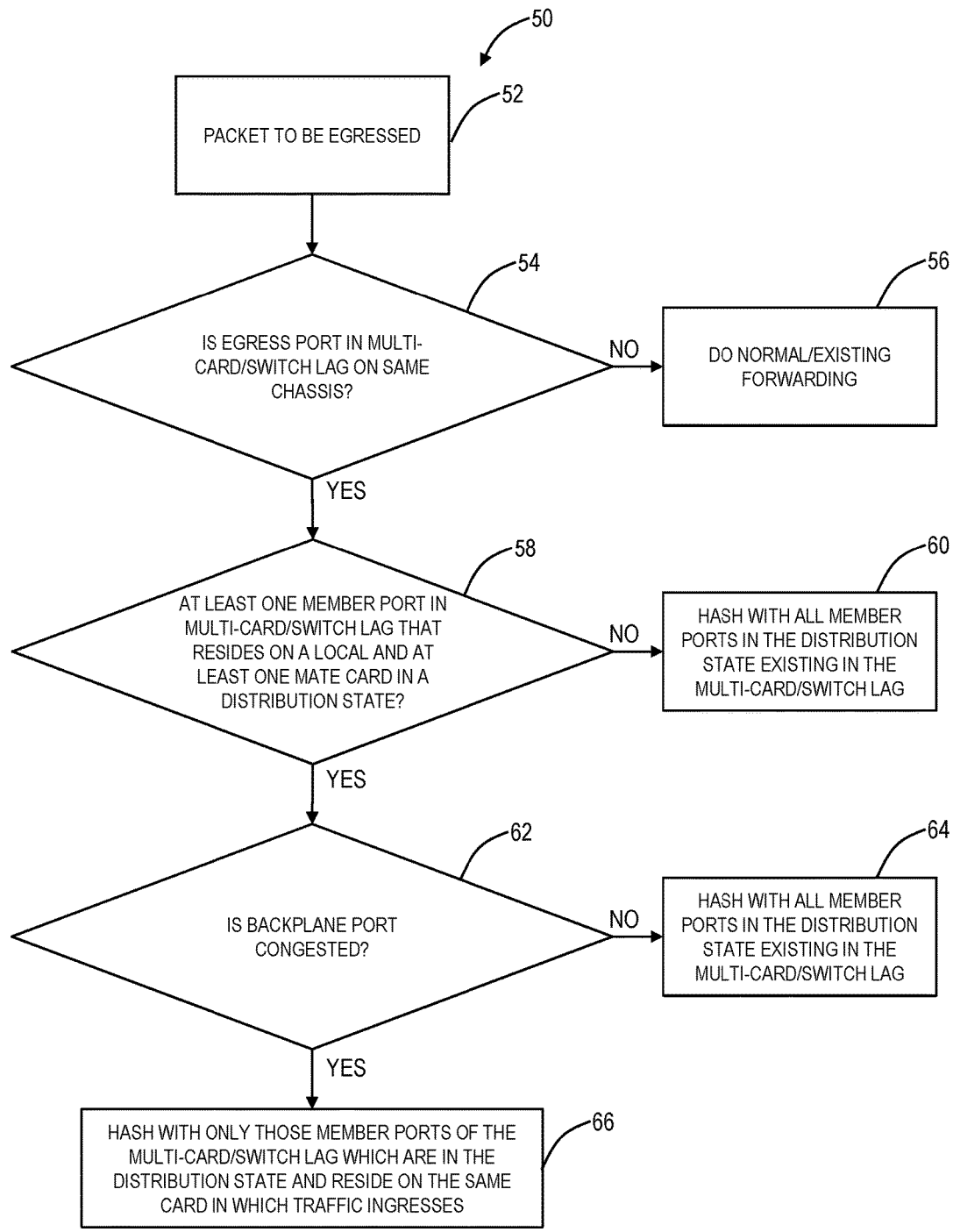
FIG. 5 is a flowchart of a port congestion resiliency process.

Referring to FIG. 5, in an exemplary embodiment, a flowchart illustrates a port congestion resiliency process 50. In various exemplary embodiments, the backplane port and inter-switch connectivity port congestion resiliency systems and methods resolve the limitations shown in FIG. 4. In cases where the backplane port 16 (or inter-switch connectivity port) is congested due to increased traffic load, the port congestion resiliency process 50 ensures that traffic egressed out of multi-card/switch LAG, egresses from that member port of the multi-card/switch LAG which exists on the same card on which traffic lands/ingresses thus eliminating connectivity to the backplane port 16 which is also not a member of the multi-card/switch LAG.

The process 50 is implemented by a network element with a multi-card/switch LAG. First, a packet is received which is to be egressed (step 52). The process 50 includes checking if the egress port is in a multi-card/switch LAG on the same chassis (step 54), and if not, the process 50 includes normal/existing forwarding, i.e., no modification to the forwarding behavior (step 56). If the egress port is in the multi-card/switch LAG (step 54), the process 50 includes checking if at least one member port in the multi-card/switch LAG that resides on a local card and at least one mate card in the network element is in a distribution state (step 58). If not (step 58), the process 50 includes hashing all member ports in the distribution state existing in the multi-card/switch LAG (step 60). That is, the member ports in the distribution state can use any egress port since all the egress ports would be on the same card based on step 58.

If there is a member port on the local card and, at least, one mate card in the distribution state (step 58), the process 50 includes checking if the backplane port (or the inter-switch connectivity port) is congested (step 62). If not (step 62), the process 50 includes hashing all member ports in the distribution state existing in the multi-card/switch LAG (step 64). That is, the member ports in the distribution state can use any egress port, even egress ports across the backplane port (or the inter-switch connectivity port) since there is no congestion based on step 62.

If there is backplane port (or inter-switch connectivity port) congestion (step 62), the process includes hashing only those member ports of the multi-card/switch LAG with are in the distribution state and which reside in the same card in which the traffic ingresses (step 66). Here, the process 50 includes removing connectivity across the backplane port (or inter-switch connectivity port) due to the congestion. Specifically, traffic for the multi-card/switch LAG will egress out on the same card it was received. In the process 50, the hashing is a technique which determines which port the packet egresses from. Accordingly, by excluding ports that are located in other cards or switches during congestion, the process 50 avoids packet drops due to the congestion on the backplane port or inter-switch connectivity port. That is, the external ports (external meaning located in a separate card/switch) are not included in the hashing where there is a chance the traffic could be lost due to congestion.

Figure 6:
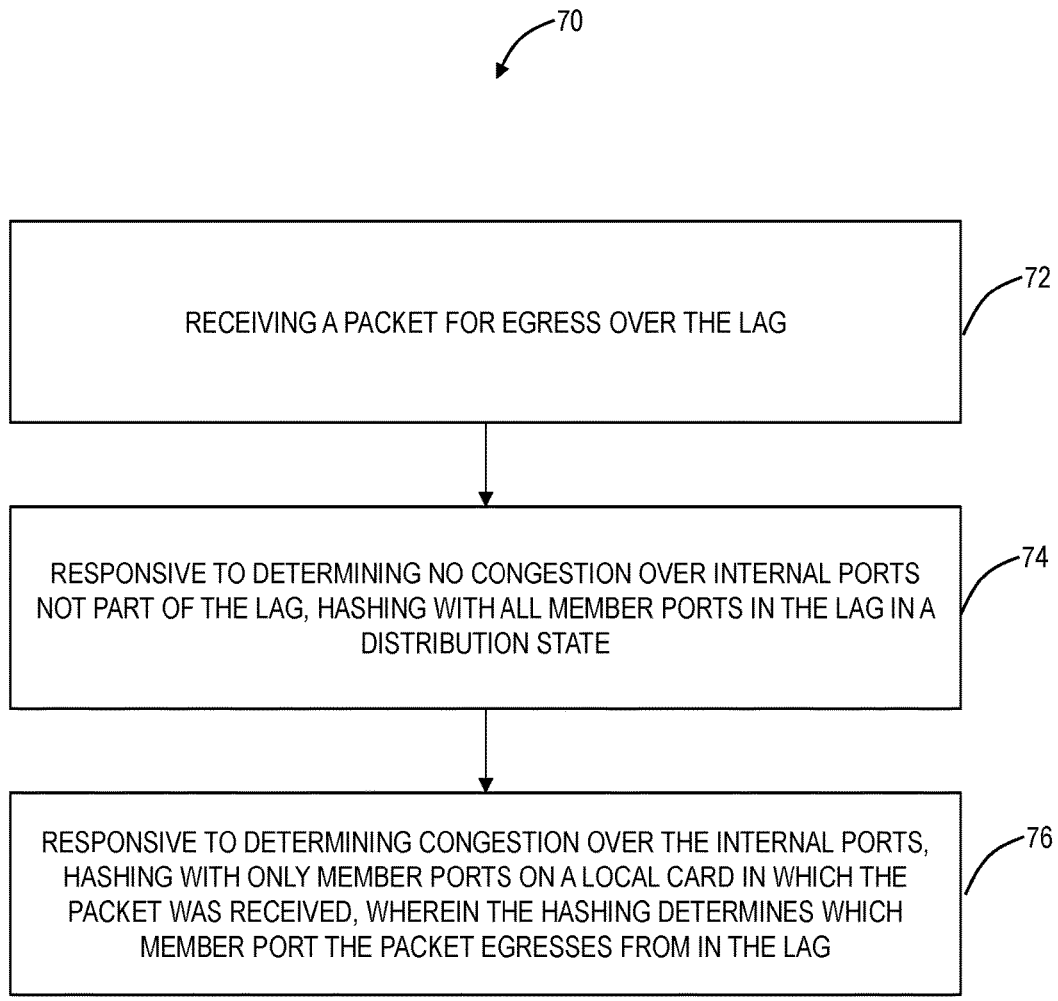
FIG. 6 is a flowchart of a process for port congestion resiliency in a Link Aggregation Group (LAG) including one or more of a multi-card LAG and a multi-switch LAG.

Referring to FIG. 6, in an exemplary embodiment, a flowchart illustrates a process 70 for port congestion resiliency in a Link Aggregation Group (LAG) including one or more of a multi-card LAG and a multi-switch LAG. The process 70 includes receiving a packet for egress over the LAG (step 72); responsive to determining no congestion over internal ports not part of the LAG, hashing with all member ports in the LAG in a distribution state (step 74); and, responsive to determining congestion over the internal ports, hashing with only member ports on a local card in which the packet was received, wherein the hashing determines which member port the packet egresses from in the LAG (step 76). The multi-card LAG includes a plurality of cards where packets ingress and egress from and the plurality of cards communicate via the internal ports including a backplane port which is not part of the LAG. The multi-switch LAG includes a plurality of chassis where packets ingress and egress from and the plurality of chassis communicate via the internal ports including an inter-switch connectivity port which is not part of the LAG. The LAG can operate in compliance with one or more of IEEE 802.1AX-2008 and IEEE 802.3ad. The internal ports can include X Gb/s of bandwidth and all ports in a network element associated with the LAG can include Y Gb/s of bandwidth with Y>X. The member ports utilize Link Aggregation Control Protocol (LACP) for membership control, and the internal ports do not utilize LACP. The hashing with only member ports on a local card in step 76 modifies input parameters to the hashing to exclude member ports on a remote card or a remote chassis. The hashing in steps 74, 76 can be performed based on TAG values associated with the packet.

The processes 50, 70 first determine whether the backplane port is congested or not. If there is no congestion, then the egressing packet shall undergo LAG hashing with all member ports existing on the multi-card/switch LAG, i.e. member ports existing on both local and mate card. However, if there is congestion, the egressing packet shall only undergo hashing with only those member ports which exist on the same/local card on which traffic ingress.

Figure 7:
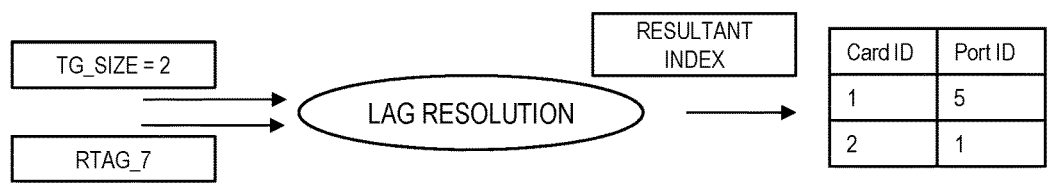
FIGS. 7, 8, and 9 are block diagrams (FIGS. 7 and 8) of exemplary hashes for the cards in the network element from FIGS. 3 and 4 and a block diagram (FIG. 9) of resulting traffic flow in the network element after the hashes in FIG. 8.
Figure 8:
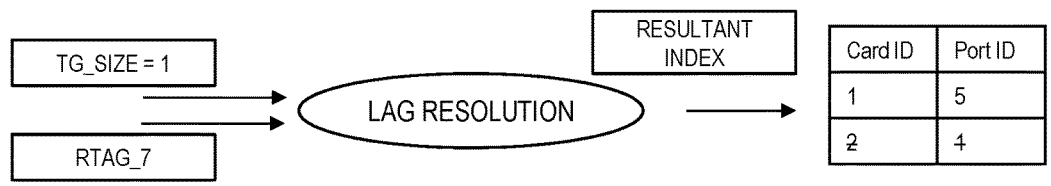
Figure 9:
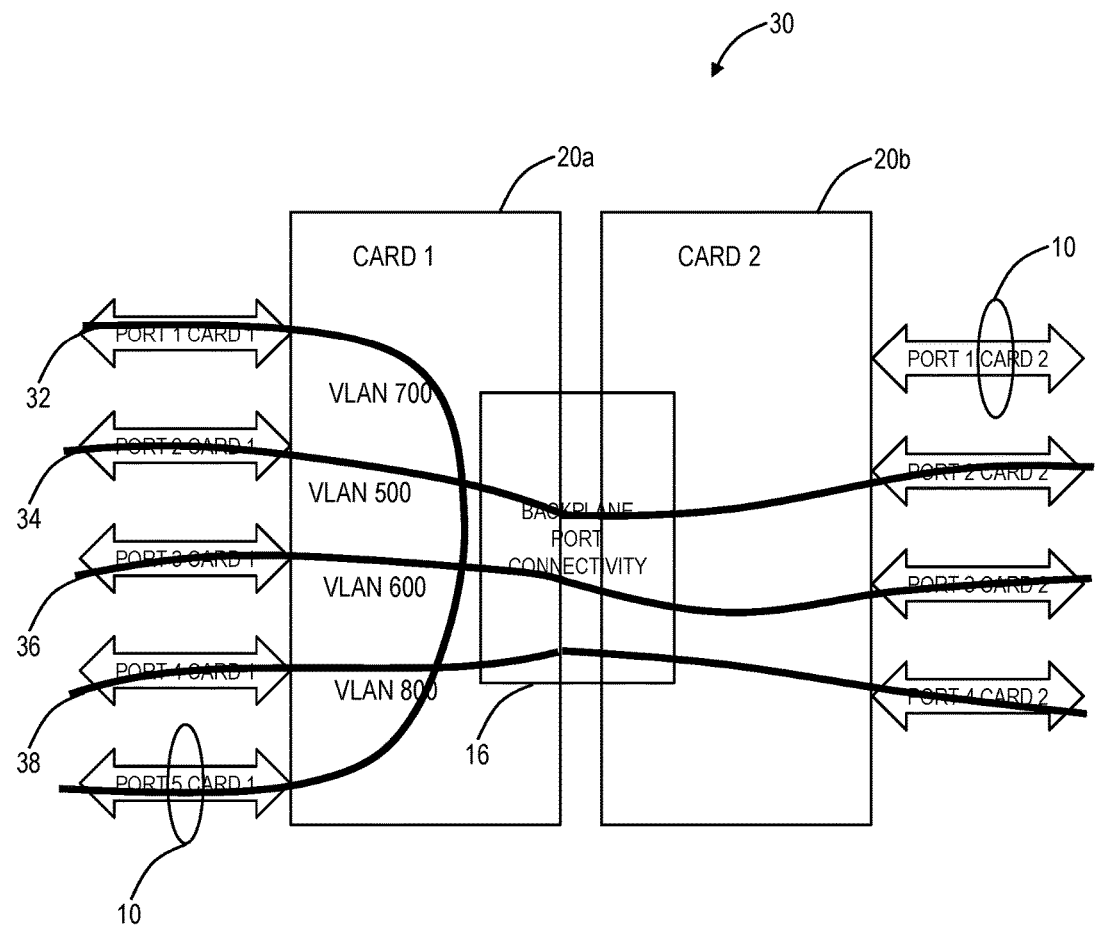

Referring to FIGS. 7-9, in exemplary embodiments, block diagrams (FIGS. 7 and 8) illustrate exemplary hashes for the cards 20a, 20b in the network element 30 and a block diagram (FIG. 9) illustrates resulting traffic flow in the network element 30 after the hashes in FIG. 8. Again, as illustrated above, the LAG 10 includes port 5/card 1 on the card 20a and port 1/card 2 on the card 20b. First, in FIG. 7, a packet is received destined for the multi-card LAG 10, and there is no congestion with all members of the LAG 10 in a distribution state. So in the example of FIG. 7, the hash will be between two member ports, namely port 5/card 1 on the card 20a and port 1/card 2 on the card 20b. Also, assume the hash algorithm is RTAG_7 (Remote VLAN TAG); of course, other hash techniques are also contemplated. In FIG. 7, the incoming packet has a TG_SIZE of 2, i.e., the number of members in the distribution state. Using RATG_7 as the hash computation algorithm and TG_SIZE as an input parameter to RTAG_7, a Resultant Index is determined which acts as an offset/index to a table containing all LAG 10 members that are in distribution state. On the basis of the resultant index, the LAG member port is determined for traffic egress.

Again, for the example described herein, the traffic ingresses from card 1/port 1 and needs to be egress from the LAG 10. Thus, each packet of such traffic gets hashed, as described above, to find the LAG 10 member port for egress. As depicted in FIGS. 3 and 4 above, each packet of the connection 32 was hashed and was egressing through card 2/port 1 (through the backplane port 16). Now when it was detected that congestion has occurred on the backplane port 16, then each packet of the connection 32 will undergo the following.

After the congestion is detected, the same hash algorithm is still used, but the value of the input parameters to the hash algorithm are manipulated to modify the contents of the table containing the member ports of the LAG 10 (remote module ports masked), in FIG. 8. Specifically, the same RTAG_7 hash computation algorithm is used with a modified value of TG_SIZE from 2 to 1 even though there are two members in the distribution state for the LAG 10. Basically, the value of TG_SIZE is reduced by the number of member ports that exist on a remote module over the congested internal ports and are in distribution state. Where the local module is the module on which traffic ingresses while the remote module is the other remaining module. In addition to modification of TG_SIZE to the hash algorithm, the contents of the table containing members is also modified such that remote module member ports of multi-switch LAG are masked.

Thus after the FIG. 8 hash computation and member LAG selection, the traffic for the connection 32 that was egressing from card 2/port 1 after the hash of FIG. 7 starts egressing from card 1/port 5 thereby elimination the need for connection 32 traffic to pass through the backplane port 16 thus safeguarding against the congestion at the backplane port 16, as illustrated in FIG. 9. FIG. 9 shows a solution to the congestion in FIG. 4, and the resulting details for FIG. 9 are:

| VLAN: ID | Stream | Ingress port | Egress port | Ingress Traffic Rate |
|---|---|---|---|---|
| 500 | 34 | Port-2/card-1 | Port-2/card-2 | 1 Gb/s |
| 600 | 36 | Port-3/card-1 | Port-3/card-2 | 1 Gb/s |

-continued

| VLAN: ID | Stream | Ingress port | Egress port | Ingress Traffic Rate |
|---|---|---|---|---|
| 700 | 32 | Port-1/card-1 | Port-5/card-1** (Multi-Card LAG) | 1 Gb/s |
| 800 | 38 | Port-4/card-1 | Port-4/card-2 | 1 Gb/s |
| Total Bandwidth used of Backplane Port/Capacity of Backplane Port | | | | 3 Gb/s/ 3 Gb/s |

**the connection 32 is no longer using the backplane port

Figure 10:
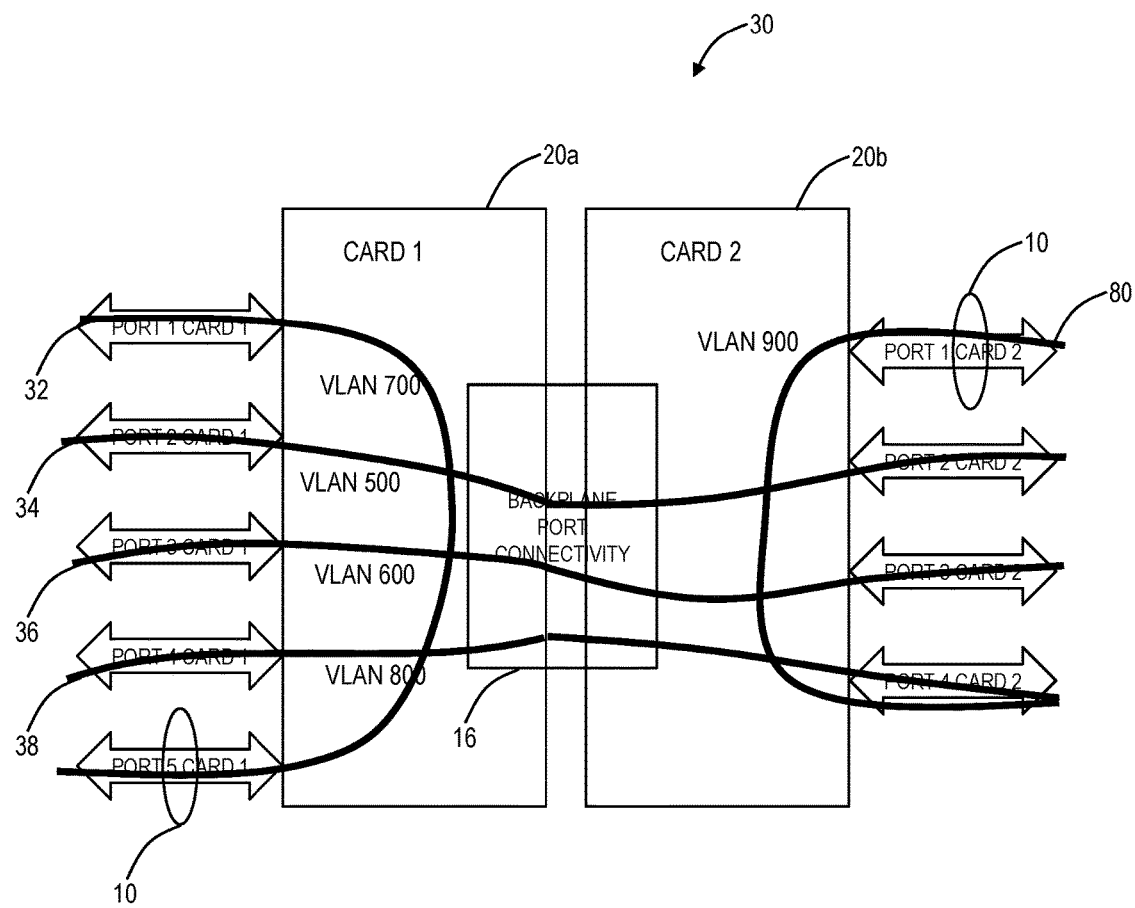
FIGS. 10, 11, and 12 are a block diagram (FIG. 10) of a resulting traffic flow in the network element after adding a new connection and block diagrams (FIGS. 11 and 12) illustrate exemplary hashes for the cards for the new connection.
Figure 11:
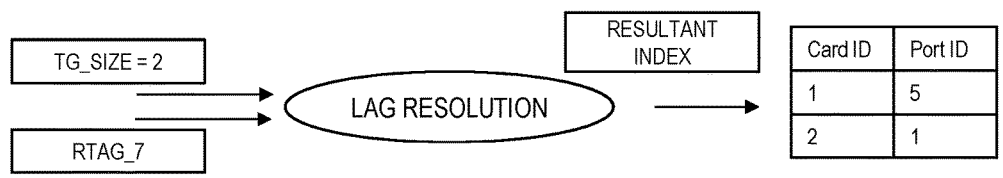
Figure 12:
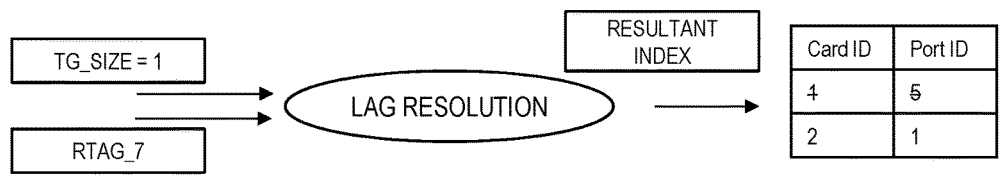

Referring to FIGS. 10-12, in an exemplary embodiment, a block diagram (FIG. 10) illustrates a resulting traffic flow in the network element 30 after adding a new connection 80 and block diagrams (FIGS. 11 and 12) illustrate exemplary hashes for the cards 20a, 20b for the new connection 80. Assume the connection 80 is 1 Gb/s and ingresses from card 2/port 4 and needs to be egressed out of the LAG 10. Then, based on the techniques described herein, the connection 80 shall get egressed from card 2/port 1 because the backplane port 16 is already congested due to connections 34, 36, 38 traffic passing through the backplane port 16. The details of FIG. 10 are as follows:

| VLAN: ID | Stream | Ingress port | Egress port | Ingress Traffic Rate |
|---|---|---|---|---|
| 500 | 34 | Port-2/card-1 | Port-2/card-2 | 1 Gb/s |
| 600 | 36 | Port-3/card-1 | Port-3/card-2 | 1 Gb/s |
| 700 | 32 | Port-1/card-1 | Port-5/card-1** (Multi-Card LAG) | 1 Gb/s |
| 800 | 38 | Port-4/card-1 | Port-4/card-2 | 1 Gb/s |
| 900 | 80 | Port-4/card-2 | Port-1/card-2** (Multi-Card LAG) | 1 Gb/s |
| Total Bandwidth used of Backplane Port/Capacity of Backplane Port | | | | 3 Gb/s/ 3 Gb/s |

**the connections 32, 80 are not using the backplane port.

FIGS. 11 and 12 illustrate hash computations for the connection 80. First, FIG. 11 illustrates a computation with no backplane congestion where TG_SIZE=2 and both member ports (card 1/port 5 and card 2/port 1) are included in the table. If the card 1/port 5 is selected in FIG. 11, another hash will have to be calculated as shown in FIG. 12 due to the backplane port congestion. In FIG. 12, the TG_SIZE is modified to 1 and the table excludes/masks the remote port (card 1/port 5).

Figure 13:
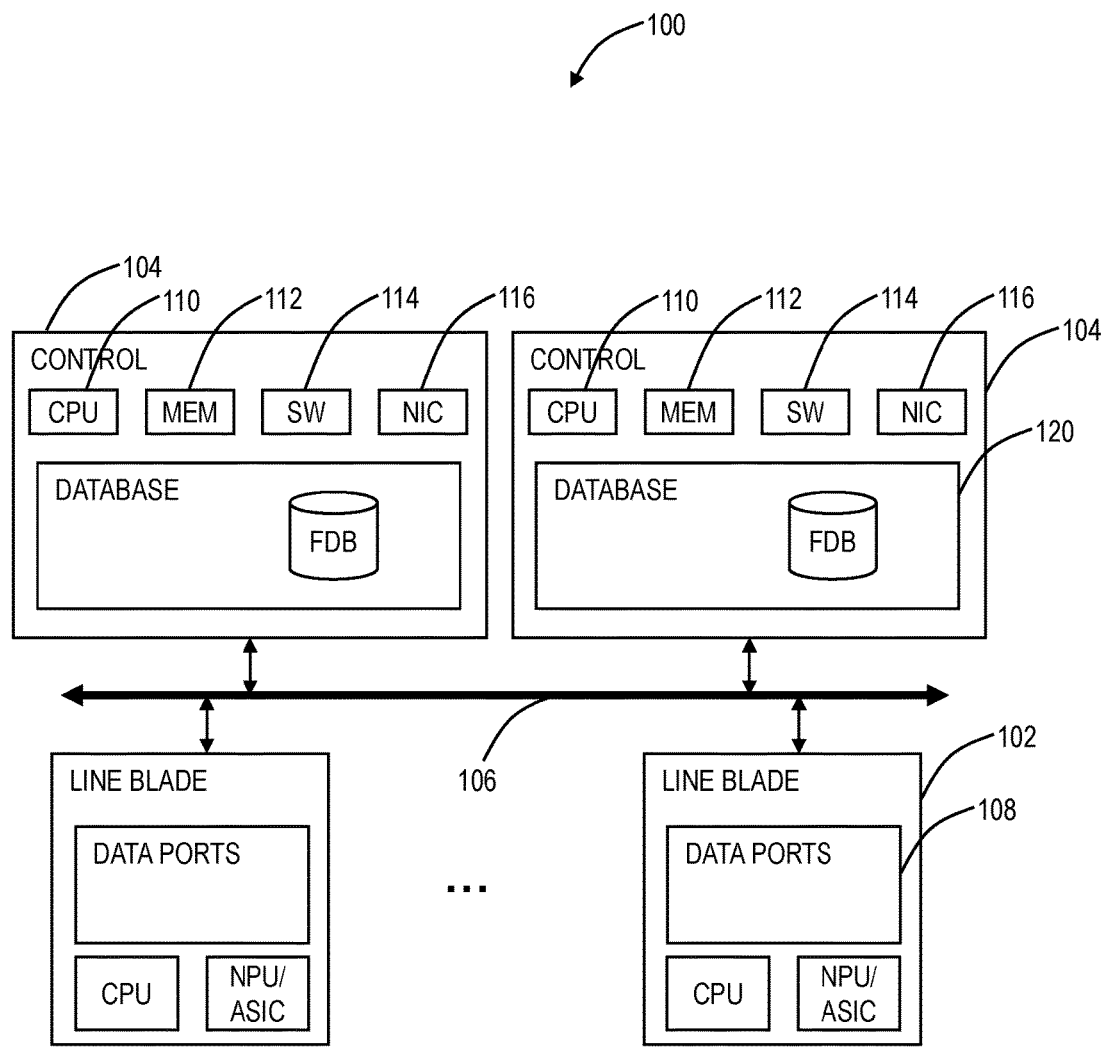
FIG. 13 is a block diagram of an exemplary implementation of a node for implementation of the backplane port and inter-switch connectivity port congestion resiliency systems and methods in a multi-card and/or multi-switch LAG.

Referring to FIG. 13, in an exemplary embodiment, a block diagram illustrates an exemplary implementation of a node 100 for implementation of the backplane port and inter-switch connectivity port congestion resiliency systems and methods in a multi-card and/or multi-switch LAG. In this exemplary embodiment, the node 100 is an Ethernet network switch, but those of ordinary skill in the art will recognize the systems and methods described herein contemplate other types of network elements and other implementations. In this exemplary embodiment, the node 100 includes a plurality of blades 102, 104 interconnected via an interface 106. The blades 102, 104 are also known as line cards, line modules, circuit packs, pluggable modules, etc. and generally refer to components mounted on a chassis, shelf, etc. of a data switching device, i.e., the node 100. Each of the blades 102, 104 can include numerous electronic devices and optical devices mounted on a circuit board along with various interconnects including interfaces to the chassis, shelf, etc.

Two exemplary blades are illustrated with line blades 102 and control blades 104. The line blades 102 generally include data ports 108 such as a plurality of Ethernet ports. For example, the line blade 102 can include a plurality of physical ports disposed on an exterior of the blade 102 for receiving ingress/egress connections. Additionally, the line blades 102 can include switching components to form a switching fabric via the backplane 106 between all of the data ports 108 allowing data traffic to be switched between the data ports 108 on the various line blades 102. The switching fabric is a combination of hardware, software, firmware, etc. that moves data coming into the node 100 out by the correct port 108 to the next node 100. "Switching fabric" includes switching units, or individual boxes, in a node; integrated circuits contained in the switching units; and programming that allows switching paths to be controlled. Note, the switching fabric can be distributed on the blades 102, 104, in a separate blade (not shown), or a combination thereof. The line blades 102 can include an Ethernet manager (i.e., a CPU) and a Network Processor (NP)/Application Specific Integrated Circuit (ASIC).

The control blades 104 include a microprocessor 110, memory 112, software 114, and a network interface 116. Specifically, the microprocessor 110, the memory 112, and the software 114 can collectively control, configure, provision, monitor, etc. the node 100. The network interface 116 may be utilized to communicate with an element manager, a network management system, etc. Additionally, the control blades 104 can include a database 120 that tracks and maintains provisioning, configuration, operational data and the like. The database 120 can include a Forwarding Database (FDB). In this exemplary embodiment, the node 100 includes two control blades 104 which may operate in a redundant or protected configuration such as 1:1, 1+1, etc. In general, the control blades 104 maintain dynamic system information including Layer two forwarding databases, protocol state machines, and the operational status of the ports 108 within the node 100.

Figure 14:
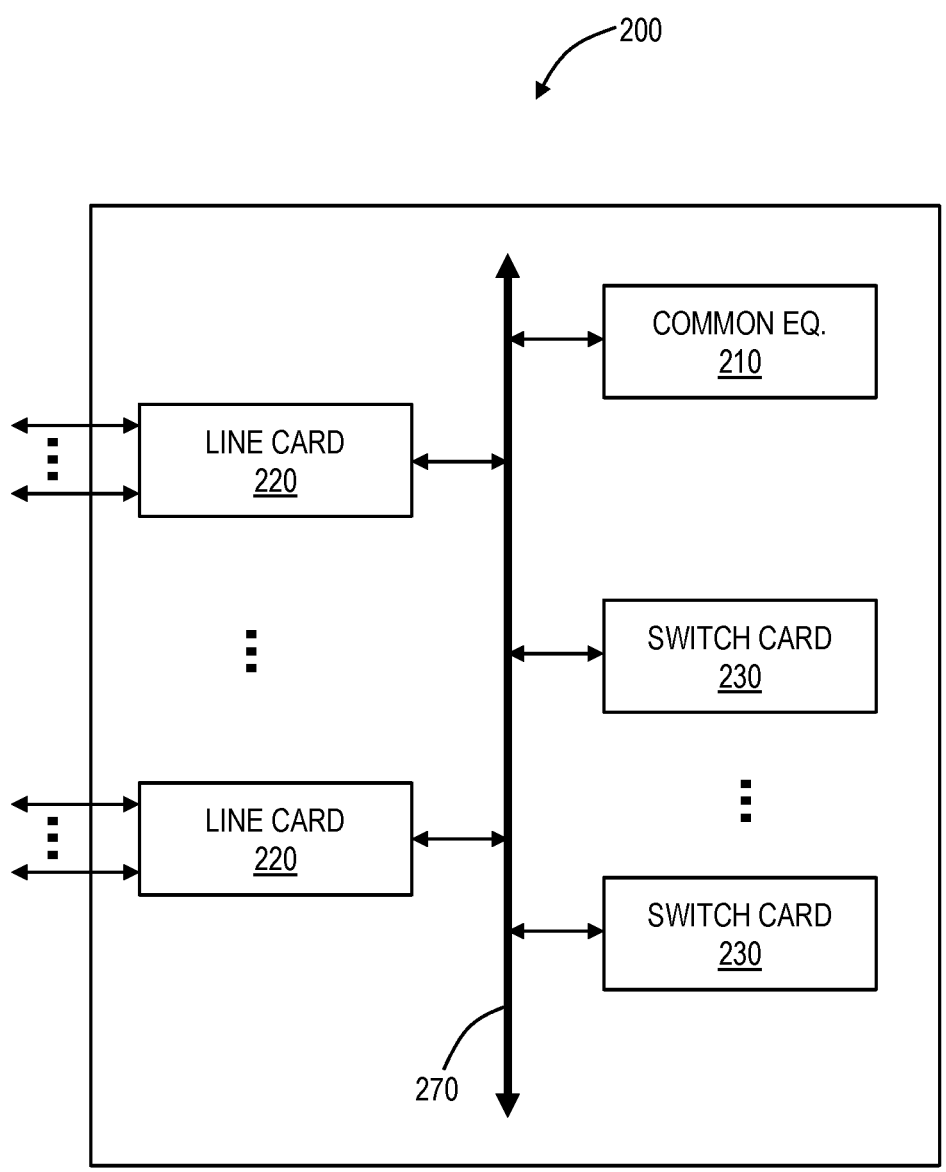
FIG. 14 is a block diagram of another exemplary implementation of a node for implementation of the backplane port and inter-switch connectivity port congestion resiliency systems and methods in a multi-card and/or multi-switch LAG.

Referring to FIG. 14, in an exemplary embodiment, a block diagram illustrates another exemplary implementation of a node 200 for implementation of the backplane port and inter-switch connectivity port congestion resiliency systems and methods in a multi-card and/or multi-switch LAG. For example, the node 100 can be a dedicated Ethernet switch whereas the node 200 can be a multiservice platform. In an exemplary embodiment, the node 200 can be a nodal device that may consolidate the functionality of a multi-service provisioning platform (MSPP), digital cross-connect (DCS), Ethernet and Optical Transport Network (OTN) switch, Dense Wave Division Multiplexed (DWDM) platform, etc. into a single, high-capacity intelligent switching system providing Layer 0, 1, 2, and/or 3 consolidation. In another exemplary embodiment, the node 200 can be any of an OTN add/drop multiplexer (ADM), a multi-service provisioning platform (MSPP), a digital cross-connect (DCS), an optical cross-connect, an optical switch, a router, a switch, a WDM terminal, an access/aggregation device, etc. That is, the node 200 can be any system with ingress and egress signals and switching of channels, timeslots, tributary units, wavelengths, etc. While the node 200 is generally shown as an optical network element, the load balancing systems and methods are contemplated for use with any switching fabric, network element, or network based thereon.

In an exemplary embodiment, the node 200 includes common equipment 210, one or more line modules 220, and one or more switch modules 230. The common equipment 210 can include power; a control module; operations, administration, maintenance, and provisioning (OAM&P) access; and the like. The common equipment 210 can connect to a management system such as a network management system (NMS), element management system (EMS), or the like. The node 200 can include an interface 270 for communicatively coupling the common equipment 210, the line modules 220, and the switch modules 230 to one another. For example, the interface 270 can be a backplane, midplane, a bus, optical or electrical connectors, or the like. The line modules 220 are configured to provide ingress and egress to the switch modules 230 and external to the node 200. In an exemplary embodiment, the line modules 220 can form ingress and egress switches with the switch modules 230 as center stage switches for a three-stage switch, e.g., a three stage Clos switch. The line modules 220 can include optical or electrical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), etc.

Further, the line modules 220 can include a plurality of connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s. The line modules 220 can include wavelength division multiplexing interfaces, short reach interfaces, and the like, and can connect to other line modules 220 on remote network elements, end clients, edge routers, and the like. From a logical perspective, the line modules 220 provide ingress and egress ports to the node 200, and each line module 220 can include one or more physical ports. The switch modules 230 are configured to switch channels, timeslots, tributary units, wavelengths, etc. between the line modules 220. For example, the switch modules 230 can provide wavelength granularity (Layer 0 switching); OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), etc.; Ethernet granularity; Digital Signal n (DSn) granularity such as DS0, DS1, DS3, etc.; and the like. Specifically, the switch modules 230 can include both Time Division Multiplexed (TDM) (i.e., circuit switching) and packet switching engines. The switch modules 230 can include redundancy as well, such as 1:1, 1:N, etc.

In an exemplary embodiment, an apparatus for port congestion resiliency in a Link Aggregation Group (LAG) including one or more of a multi-card LAG and a multi-switch LAG includes circuitry adapted to receive a packet for egress over the LAG; circuitry adapted to, responsive to no congestion over internal ports not part of the LAG, hash with all member ports in the LAG in a distribution state; and circuitry adapted to, responsive to congestion over the internal ports, hash with only member ports on a local card in which the packet was received, wherein the hash determines which member port the packet egresses from in the LAG. The circuitry can be part of the nodes 100, 200, such as on the line blades 102, the control blades 104, the line cards 220, the switch cards 230, a combination thereof, and the like.

In another exemplary embodiment, a network element adapted for port congestion resiliency in a Link Aggregation Group (LAG) including one or more of a multi-card LAG and a multi-switch LAG includes one or more chassis, wherein each of the one or more chassis includes a backplane and the one or more chassis are connected by inter-switch connectivity ports; and one or more cards in the one or more chassis including member ports for the LAG, wherein the one or more cards communicate to one another in a same chassis via a backplane port over the backplane and the one or more cards in different chassis communicate to one another via the inter-switch connectivity ports, wherein the backplane port and the inter-switch connectivity ports include internal ports in the network element. The network element may include the nodes 100, 200, or the like. The network element is configured to operate the LAG and to receive a packet for egress over the LAG; responsive to no congestion over internal ports not part of the LAG, hash with all member ports in the LAG in a distribution state; and, responsive to congestion over the internal ports, hash with only member ports on a local card in which the packet was received, wherein the hash determines which member port the packet egresses from in the LAG.

The multi-card LAG includes a plurality of cards where packets ingress and egress from and the plurality of cards communicate via the internal ports including a backplane port which is not part of the LAG. The multi-switch LAG includes a plurality of chassis where packets ingress and egress from and the plurality of chassis communicate via the internal ports including an inter-switch connectivity port which is not part of the LAG. The LAG can operate in compliance with one or more of IEEE 802.1AX-2008 and IEEE 802.3ad. The internal ports can include X Gb/s of bandwidth and all ports in a network element associated with the LAG can include Y Gb/s of bandwidth with Y>X. The member ports utilize Link Aggregation Control Protocol (LACP) for membership control and the internal ports do not utilize LACP. The hash with only member ports on a local card includes modification of input parameters to the hashing to exclude member ports on a remote card or a remote chassis. The hash can be performed based on TAG values associated with the packet.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various exemplary embodiments.

Moreover, some exemplary embodiments may include a non-transitory computer-readable storage medium having computer readable code stored thereon for programming a computer, server, appliance, device, processor, circuit, etc.

each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for port congestion resiliency in a Link Aggregation Group (LAG) comprising one or more of a multi-card LAG and a multi-switch LAG, the method comprising:
   receiving a packet for egress over the LAG;
   responsive to determining no congestion over internal ports not part of the LAG, hashing with all member ports on a plurality of cards in the LAG in a distribution state, wherein the plurality of cards are part of the one or more of a multi-card LAG and a multi-switch LAG, wherein cards in the multi-card LAG communicate via backplane ports which are not part of the LAG, and wherein cards in the multi-switch LAG communicate via inter-switch connectivity ports which are not part of the LAG; and
   responsive to determining congestion over the internal ports, hashing with only member ports on a same local card in which the packet was received, wherein the hashing determines which member port the packet egresses from in the LAG and, by hashing with only member ports on the same local card, the packet egresses on the same local card when there is congestion.

2. The method of claim 1, wherein the LAG operates in compliance with one or more of IEEE 802.1AX-2008 and IEEE 802.3ad.

3. The method of claim 1, wherein the internal ports comprise X Gb/s of bandwidth and all ports in a network element associated with the LAG comprise Y Gb/s of bandwidth with Y>X.

4. The method of claim 1, wherein the member ports utilize Link Aggregation Control Protocol (LACP) for membership control and the internal ports do not utilize LACP.

5. The method of claim 1, wherein the hashing with only member ports on a local card modifies input parameters to the hashing to exclude member ports on a remote card or a remote chassis.

6. The method of claim 1, wherein the hashing is performed based on TAG values associated with the packet.

7. An apparatus for port congestion resiliency in a Link Aggregation Group (LAG) comprising one or more of a multi-card LAG and a multi-switch LAG, the apparatus comprising:
   circuitry adapted to receive a packet for egress over the LAG;
   circuitry adapted to, responsive to no congestion over internal ports not part of the LAG, hash with all member ports on a plurality of cards in the LAG in a distribution state, wherein the plurality of cards are part of the one or more of a multi-card LAG and a multi-switch LAG, wherein cards in the multi-card LAG communicate via backplane ports which are not part of the LAG, and wherein cards in the multi-switch LAG communicate via inter-switch connectivity ports which are not part of the LAG; and
   circuitry adapted to, responsive to congestion over the internal ports, hash with only member ports on a same local card in which the packet was received, wherein the hash determines which member port the packet egresses from in the LAG and, by hashing with only member ports on the same local card, the packet egresses on the same local card when there is congestion.

8. The apparatus of claim 7, wherein the LAG operates in compliance with one or more of IEEE 802.1AX-2008 and IEEE 802.3ad.

9. The apparatus of claim 7, wherein the internal ports comprise X Gb/s of bandwidth and all ports in a network element associated with the LAG comprise Y Gb/s of bandwidth with Y>X.

10. The apparatus of claim 7, wherein the member ports utilize Link Aggregation Control Protocol (LACP) for membership control and the internal ports do not utilize LACP.

11. The apparatus of claim 7, wherein the hash with only member ports on a local card modifies input parameters to the hashing to exclude member ports on a remote card or a remote chassis.

12. A network element adapted for port congestion resiliency in a Link Aggregation Group (LAG) comprising one or more of a multi-card LAG and a multi-switch LAG, the network element comprising:
   one or more chassis, wherein each of the one or more chassis comprises a backplane and the one or more chassis are connected by inter-switch connectivity ports; and
   one or more cards in the one or more chassis comprising member ports for the LAG, wherein the one or more cards communicate to one another in a same chassis via a backplane port over the backplane and the one or more cards in different chassis communicate to one another via the inter-switch connectivity ports, wherein the backplane port and the inter-switch connectivity ports comprise internal ports in the network element;
   wherein the network element operates the LAG and is configured to
      receive a packet for egress over the LAG,
      responsive to no congestion over internal ports not part of the LAG, hash with all member ports on a plurality of cards in the LAG in a distribution state, wherein the plurality of cards are part of the one or more of a multi-card LAG and a multi-switch LAG, wherein cards in the multi-card LAG communicate via backplane ports which are not part of the LAG, and wherein cards in the multi-switch LAG communicate via inter-switch connectivity ports which are not part of the LAG, and responsive to congestion over the internal ports, hash with only member ports on a same local card in which the packet was received, wherein the hash determines which member port the packet egresses from in the LAG and, by hashing with only member ports on the same local card, the packet egresses on the same local card when there is congestion.

13. The network element of claim 12, wherein the LAG operates in compliance with one or more of IEEE 802.1AX-2008 and IEEE 802.3ad.

14. The network element of claim 12, wherein the internal ports comprise X Gb/s of bandwidth and all ports in a network element associated with the LAG comprise Y Gb/s of bandwidth with Y>X.

15. The network element of claim 12, wherein the member ports utilize Link Aggregation Control Protocol (LACP) for membership control and the internal ports do not utilize LACP.

16. The network element of claim 12, wherein the hash with only member ports on a local card modifies input parameters to the hashing to exclude member ports on a remote card or a remote chassis.

\* \* \* \* \*